May 31, 1960 B. R. NICHOLS 2,938,527
CONTROL SYSTEM FOR HYDRAULIC TURBINES
Filed Feb. 23, 1954
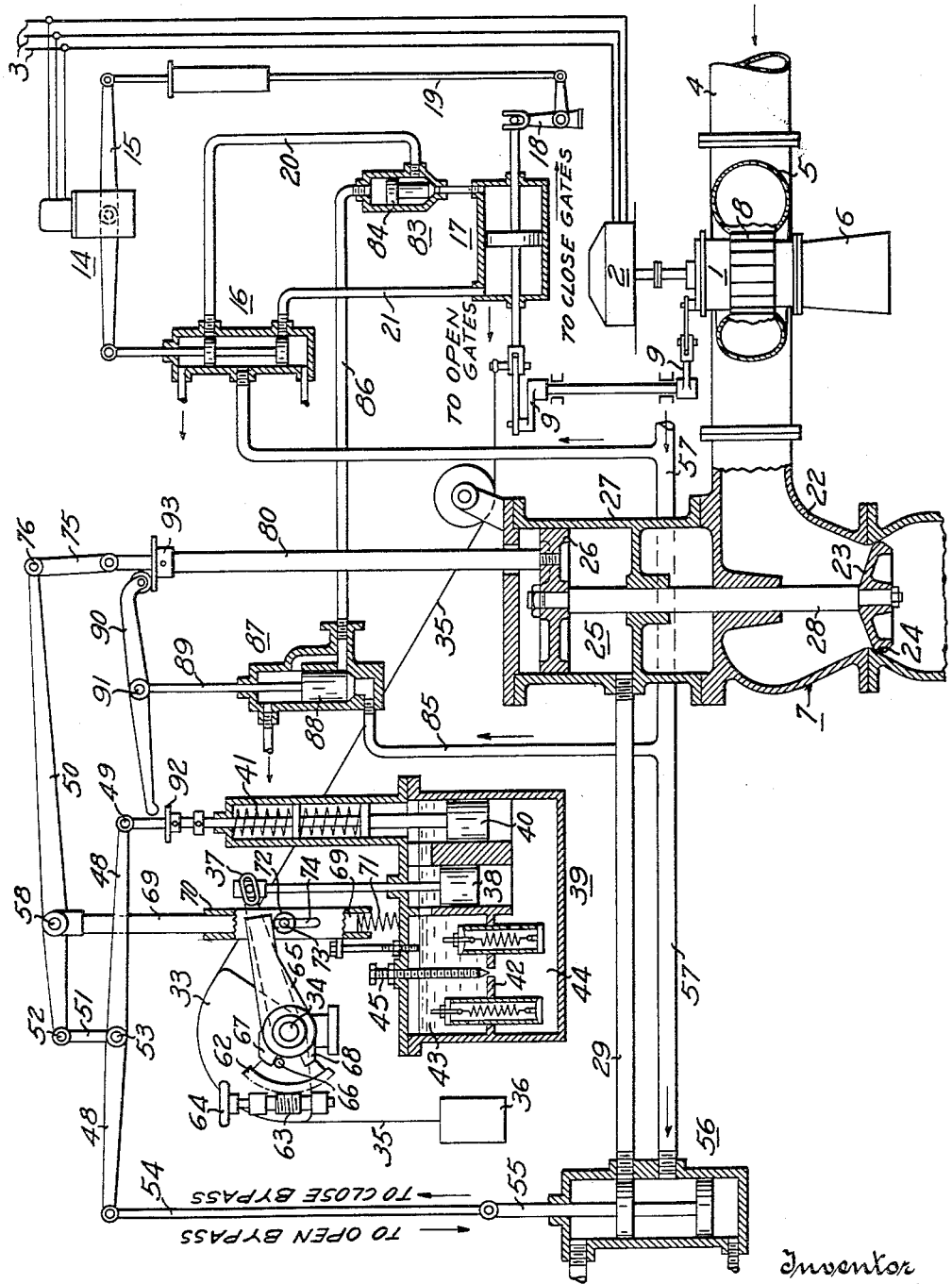
Inventor
Beverly R. Nichols
by Arthur M. Streich
Attorney

United States Patent Office 2,938,527
Patented May 31, 1960

2,938,527

CONTROL SYSTEM FOR HYDRAULIC TURBINES

Beverly R. Nichols, Wauwatosa, Wis., assignor to Allis-Chalmers Manufacturing Company, Milwaukee, Wis.

Filed Feb. 23, 1954, Ser. No. 411,965

14 Claims. (Cl. 137—25)

This invention relates to control systems for hydraulic turbine installations that include valve means for controlling admission of water to the turbine, and bypass means for bypassing water around the turbine.

When the flow of water through a turbine is suddenly reduced or stopped, such as takes place on sudden reduction in load upon the turbine, the kinetic energy of the water produces a pressure increase in the conduit delivering water to the turbine. This pressure increase is called water hammer and can be destructive to the installation. One way to avoid water hammer is to provide bypass means usually called a pressure regulator to bypass at least a major portion of the water suddenly shut off from the turbine. It is therefore necessary to have a control system that is sensitive to changes in load upon the turbine for operating turbine inlet valve means and the pressure regulator in a manner so the pressure regulator will bypass water around the turbine upon rapid closing of the turbine inlet valve means and if the pressure regulator should fail to operate properly the closing action of the turbine inlet valve means will be retarded or stopped in order to avoid the danger of water hammer. A control system used in the past is shown in Patent 1,706,813 issued to A. Pfau, March 26, 1929. In the Pfau system a servomotor sensitive to load changes moves a rod which is connected to an operating leverage for the turbine inlet valve means and to an operating leverage for a pressure regulator. The operating leverage for the pressure regulator in the Pfau system is so designed that if the pressure regulator fails to function properly its operating leverage will resist the force exerted by the servomotor and prevent or retard closing of the turbine inlet valve means. In order to resist the force applied by the servomotor, the rod and operating leverages must have great strength and as a result the apparatus is expensive to manufacture.

For example, in one installation in which a 92,000 horsepower turbine carries a load of 85,000 kilowatts, if the entire load is taken off the turbine and the pressure regulator operates properly, the servomotor can open the pressure regulator and close the turbine inlet valve in about three seconds. If however the action of the pressure regulator is retarded and the force applied by the servomotor resisted so that the pressure regulator does not open completely and the valve means do not close completely for 48 seconds, the pressure regulator produces a counteraction on the servomotor of about 300,000 foot-pounds. Also, if the pressure regulator does not open at all, or stops openings before it has opened the required amount so that the valve closing action of the servomotor is stalled, the connecting rod between the servomotor and the operating leverages of the pressure regulator and valve means is subjected to a tensional force of about 600,000 pounds. It can therefore be appreciated that to withstand forces of such great magnitude the connecting rod and the elements of the operating leverages must have great strength, be very large and therefore expensive to manufacture. Accordingly it is an object of this invention to provide a new and improved control system that protects against dangerous water hammer and that is inexpensive to manufacture.

Another object of the invention is to provide a new and improved control system in which upon sudden reduction of load on the turbine the inlet valve means will begin to close but after closing a predetermined amount no additional valve closing force will be applied to the system unless the pressure regulator has opened sufficiently to avoid danger of water hammer. Thus it is within the nature of the present invention to eliminate the force tending to close the turbine inlet valve means and open the bypass means, when the bypass fails to open properly, rather than depending upon the strength of the elements of the system to resist such force when the bypass means fails to open properly.

It is also a requirement that a control system be adjustable to coordinate the turbine inlet valve means and the bypass means to operate in a manner known as water-saving, water-wasting or a combination of both such operations. A water-wasting operation is one in which the bypass opens synchronously with closing of the turbine inlet valve means and remains open. This type of operation may be required, for example, when the maximum amount of water must pass downstream to supply the needs of other turbines. A water-saving operation is one in which the bypass opens synchronously with rapid closing of turbine inlet valve means to avoid water hammer after which the bypass closes slowly so that the water in the turbine forebay is conserved. If the turbine inlet valve means closes slowly so that there is no danger of water hammer, the bypass means will remain closed. A combined water-wasting and water-saving operation is one in which it is required that some water bypass a turbine but not the maximum capacity of the bypass. The system then operates on the water-saving principle until the flow through the turbine is the minimum required to supply needs downstream and then if the flow through the turbine is further reduced the bypass opens synchronously with closing of the turbine inlet valve means so that discharge downstream is kept constant and equal to minimum requirements. It is therefore also an object of this invention to provide a new and improved control system that can be easily and simply adjusted to operate in a water-wasting manner, a water-saving manner or a combination of both.

Objects and advantages other than those above set forth will be apparent as the description of the invention proceeds.

The novel features of the invention and how the objects are attained will appear from this specification and the accompanying drawing showing one embodiment of the invention and forming a part of this application, and all of these novel features are intended to be pointed out in the claims.

Generally, the present invention is to be employed for controlling both turbine inlet valve means of a turbine which may be one of the known types of reaction or impulse hydraulic turbines and bypass means for bypassing water around the turbine. As will more fully appear the control system includes bypass control means adjustable for various modes of operation, connected to turbine inlet valve operating means so that the bypass means may open when the turbine inlet valve means closes and the bypass means may close when the turbine inlet valve means opens. A throttling means is provided that is operative to stop closing action of the inlet valve operating means. Throttling control means are so connected to the throttling means and the bypass control means that bypass opening action of the bypass control means greater than a predetermined amount tends to operate the throttling means so as to stop closing action of the inlet valve operating means. The throttling control means are also connected to the bypass means so that opening of the bypass neutralizes the aforesaid tendency. Thus upon sudden reduction of the load on the turbine, the inlet valve means will begin to close but after closing a predetermined amount no additional movement of the turbine inlet valve means can take place unless the pressure regulator has opened sufficiently to avoid the danger of water hammer.

Referring particularly to the drawing, a hydraulic turbine 1 is provided to drive an electric generator 2 supplying power to an electric network 3. Water is delivered to the turbine 1 by a penstock 4 connected to a casing 5 that surrounds the turbine. Water admitted to the turbine 1 is discharged therefrom through a draft tube 6. Bypass means is provided to bypass water around turbine 1 and includes a pressure regulator 7 for controlling the flow of water through the bypass means and thereby regulating the pressure in penstock 4. The flow of water through the turbine is controlled by inlet valve means which when the turbine is of the reaction type may be a plurality of wicket gates 8 that are opened and closed by a gate operating leverage 9.

To control the power output of turbine 1 a governor 14 adjusts a floating lever 15 so that a pilot valve 16 admits pressure fluid to a servomotor 17 through one of a pair of conduits 20 and 21. The servomotor 17 is connected to the gate operating leverage 9 for operating the gates 8. The governor 14 may be of the type shown in Patent 2,126,684 to J. J. Ring et al., January 25, 1938. When the load on the turbine is increased governor 14 adjusts the floating lever 15 so that pilot valve 16 admits pressure fluid to the right hand end of servomotor 17 and the gates 8 are moved in an opening direction. When the load on the turbine is decreased governor 14 adjusts floating lever 15 so that pilot valve 16 admits pressure fluid to the left hand end of servomotor 17 and the gates 8 are moved in a closing direction. Gate operating action of servomotor 17 also acts through a bell crank 18 and a rod 19 connected to floating lever 15 to provide the usual relay connection back to the governor 14.

The bypass means for bypassing a required amount of water around turbine 1 comprises the following described structure. A pressure regulator 7 having a housing 22 and a valve disk 23 which is movable against a seat 24 to shut off the flow of water through the pressure regulator. A servomotor 25 is mounted on the valve housing 22. Servomotor 25 comprises a movable piston 26 within a cylinder 27. Piston 26 is connected to valve disk 23 by a connecting rod 28 which passes through housing 22. Pressure fluid is admitted to cylinder 27 beneath piston 26 through a conduit 29. To close the pressure regulator 7 pressure fluid lifts piston 26 and thereby lifts the valve disk 23 into engagement with seat 24. To open the pressure regulator 7 pressure fluid is released from beneath piston 26 and the force of water within the housing 22 bearing down on the top of valve disk 23 will open the pressure regulator.

As will appear bypass control means are provided to control the operation of the pressure regulator 7 automatically in response to action of the gate operating servomotor 17 in the manner of water-wasting, water-saving, or in a combination of water-saving and water-wasting operations. The bypass control means as will also appear can be manually adjusted to operate the pressure regulator as desired regardless of the action of the gate operating servomotor.

The bypass control means includes the following described structure. A segment 33 secured to a shaft 34. A cable 35 connected at one end to servomotor 17 passes over segment 33 so that gate operating action of servomotor 17 will rotate segment 33 and shaft 34 about its axis. Tension is maintained in cable 35 by a weight 36 attached to the other end of the cable. A lever 37 is secured at one end to shaft 34 to rotate with shaft 34 and segment 33. The other end of lever 37 is connected to one piston 38 of a dashpot assembly 39. A second piston 40 is mounted in the dashpot assembly 39 and is biased downwardly by a spring 41. The two pistons 38 and 40 and an internal wall 42 divide the dashpot assembly 39 into two chambers 43, 44. Dashpot 39 is filled with oil to a desired level and a needle valve 45 permits oil flow from chamber 44 to chamber 43 and back to chamber 44 for reasons that will appear. Piston 40 is connected to one end of a floating lever 48 by a pin 49. Lever 48 is suspended at its midportion from a second floating lever 50 by a link 51 which is connected at one end to lever 50 by a pin 52 and at the other end to lever 48 by a pin 53. The other end of lever 48 is connected by a link 54 to a control rod 55 of a pilot valve 56. Pilot valve 56 controls the flow of pressure fluid from a conduit 57 to conduit 29 to thereby control the operation of the pressure regulator 7 in the manner hereinbefore described. Conduit 57 is connected to a source of pressure fluid (not shown).

As much of the control system as has been so far described operates in the following described manner. After turbine 1 has been started as hereinbefore described with gates 8 now part way open, pressure regulator 7 closed and needle valve 45 open, operation of servomotor 17 to close gates 8 in response to a decreased load on the electrical network 3 will pull cable 35 to the right. Cable 35 then rotates segment 33, shaft 34 and lever 37 in a clockwise direction. Clockwise rotation of lever 37 pushes piston 38 downwardly decreasing the size of chamber 44. If the downward movement of piston 38 is slow enough for oil in chamber 44 to pass through needle valve 45 into chamber 43 without building enough pressure in chamber 44 to move piston 40 upwardly against the bias of spring 41, pilot valve 56 continues to close conduit 29 and pressure regulator 7 will remain closed. If however gates 8 are closed at a rate fast enough for pressure to build up in chamber 44 sufficient to move piston 40 upwardly against the bias of spring 41, lever 48 will be rotated counterclockwise around pin 53. This will move link 54 and the control rod 55 downwardly to actuate valve 56 to drain pressure fluid from conduit 29 and servomotor 25. Releasing the pressure fluid from servomotor 25 opens the pressure regulator 7 in the manner hereinbefore described. In the meantime, however, spring 41 continues to exert a downward force on piston 40. As soon as the rate of gate closing action slows or is stopped, the pressure in chamber 44 will drop as a result of oil passing from chamber 44 to chamber 43 at a rate determined by the setting of needle valve 45. As the pressure in chamber 44 decreases, spring 41 will move piston 40 downward and lever 48 is rotated clockwise around pin 53 to once again port pressure fluid to servomotor 25 and close pressure regulator 7. The operation of the system so far described is water saving. That is, only upon rapid closing movement of gates 8 will pressure regulator 7 open, to prevent water hammer, and then pressure regulator 7 closes slowly to conserve water. Closing of presure regulator 7 must be at a slow enough rate so that there is no danger of water hammer from this safety device itself. This rate is determined and can be varied by adjusting the setting of needle valve 45.

The system as so far described can also be operated in a water-wasting manner by completely closing needle valve 45. With needle valve 45 closed downward movement of piston 38 will cause upward movement of piston 40 regardless of the rate at which gates 8 are closing and pressure regulator 7 will open and remain open. Needle valve 45 is not, however, a completely satisfactory means for adjusting the system because the needle valve cannot be adjusted to provide for combined water-saving and water-wasting operations, it must be one or the other but not a combination of both. For this reason, needle valve 45 is ordinarily depended upon only to vary the rate at which the system responds in a water-saving manner. Needle valve 45 therefore need not ever be completely closed and other means are provided as will appear for operating the system in a water-wasting manner regardless of the needle valve setting and that are adjustable to provide combined water-saving and water-wasting operation.

To operate pressure regulator 7 in a water-wasting manner or to combine water-saving with water-wasting operation the bypass control means are provided with additional means which may include as shown the following described structure. A gear 62 keyed to shaft 34 for limited rotational movement relative to shaft 34 and segment 33. The angular position of gear 62 relative to shaft 34 and segment 33 is adjusted by a worm gear 63 which may be carried by segment 33. The gear 63 in turn may be adjusted by means such as a hand wheel 64 as shown. Gear 62 is provided with an axially projecting pin 66. A lever 65 is journaled on shaft 34 for rotational movement relative to shaft 34. Lever 65 is provided with a pair of angularly spaced lugs 67, 68 extending radially from the axis of shaft 34 a distance at least equal to the radial displacement of pin 66 from the axis of shaft 34. The end portion of lever 65 is engageable with a rod 69 in a manner that will appear. Rod 69 is mounted within a sleeve 70 which may be supported by dashpot 39. Rod 69 is supported relative to sleeve 70 by a compressible spring 71. Lever 65 engages rod 69 by resting on a roller 72 mounted on a pin 73 that passes through a slot 74 in sleeve 70 and is rigidly secured to rod 69. Rod 69 is connected to lever 50 by a pin 58 intermediate the two ends of lever 50. One end of lever 50 is connected to the link 51 and the other end is connected to a link 75 by a pin 76.

To adjust the system to operate in a water-wasting manner (that is, so the pressure regulator 7 opens synchronously in response to closing gates 8 and remains open until closed in response to opening of gates 8), when gates are wide open hand wheel 64 is turned so as to cause worm gear 63 to rotate gear 62 clockwise relative to shaft 34 and segment 33 until pin 66 engages lug 67. With pin 66 engaging lug 67 gate closing action of servomotor 17 will rotate segment 33, shaft 34 and gear 62 in a clockwise direction. Pin 66 then pushes lug 67 and lever 65 pushes down on roller 72. Rod 69 is therefore pushed downwardly compressing spring 71. The downward movement of rod 69 rotates lever 50 counterclockwise about pin 76 which in turn rotates lever 48 counterclockwise about pin 49 and link 54 is lowered to cause pressure regulator 7 to open in the manner beford described. Gate opening action of servomotor 17 will rotate segment 33, shaft 34 and gear 62 in a counterclockwise direction and pin 66 is moved away from lug 67. When pin 66 no longer engages lug 67 no downward push is applied to rod 69 and spring 71 then raises rod 69 to cause the pressure regulator 7 to close.

If it is desired that the system operate in the water saving manner hereinbefore described, hand wheel 64 is turned so as to rotate gear 62 counterclockwise relative to shaft 34 and segment 33 until pin 66 comes in contact with lug 68. With pin 66 no longer engaging lug 67 lever 65 will not push down on rod 69 when the gates 8 are closed. With lever 65 thereby inoperative pressure regulator 7 will be controlled only by the action of piston 40 and the system will operate only in the water-saving manner hereinbefore described.

Hand wheel 64 may also adjust the system to operate the pressure regulator 7 in the water-saving manner for a fraction of the gate closing stroke of servomotor 17, and in the water-wasting manner for the remainder of the gate closing stroke of servomotor 17. For example, if it is desired that no less than one half of the maximum flow of water through turbine 1 be delivered downstream at all times, the system can be adjusted to save water as long as gates 8 are open far enough to allow at least one half of maximum flow to pass through the turbine and to waste water to keep the flow of water constant at that amount if the gates are closed so as to allow less than one half of maximum flow pass through the turbine. To do this, hand wheel 64 is turned so as to position gear 62 relative to segment 33 so that pin 66 will engage lug 67 when gates 8 have reduced flow through turbine 1 to one-half maximum capacity. Before pin 66 engages lug 67 operation will be water-saving. When gates 8 are closed far enough for pin 66 to engage lug 67 any further closing of the gates will cause pressure regulator 7 to waste enough water to keep the total flow through turbine 1 and pressure regulator 7 at a constant amount.

In any of the heretofore described operations pressure regulator 7 must open or close only as much as is required by a particular gate operating action of servomotor 17 to avoid danger of water hammer. It is therefore necessary that means be provided to stop opening or closing action of pressure regulator 7 when valve disk 23 has arrived at a new position called for by a change in the position of gates 8. Adjusting means are therefore provided to adjust the bypass control means and stop operation of servomotor 25 when servomotor 25 has reacted in the manner required by the action of servomotor 17 in view of the setting of hand wheel 64. The adjusting means comprise a rod 80 connecting servomotor piston 26 (of the bypass means) to link 75 (of the bypass control means). Thus when link 54 is lowered to open pressure regulator 7 and piston 26 moves to the required position, rod 80 will move downwardly and rotate lever 50 clockwise about pin 58. This causes link 51 to rotate lever 48 clockwise about pin 49 and to raise link 54 so as to restore control rod 55 of pilot valve 56 to its neutral position. Likewise, required bypass closing action will raise rod 80 to adjust the leverage operating pilot valve 56 so as to stop further bypass closing action of servomotor 25.

In any of the described operations of this system the protection afforded against water hammer would be for naught if the bypass means failed to open as required when the turbine inlet valve means are closing. Throttling means are therefore provided that are operative to throttle gate closing action of servomotor 17 after predetermined closing action of servomotor 17, however if pressure regulator 7 functions properly the operation of the throttling means is neutralized and servomotor 17 can continue to move in a gate closing direction. The throttling means shown in the drawing comprises a valve 83 that is operative to stop discharge of fluid from servomotor 17 through conduit 20. If the design of gates 8 is such that water in casing 5 tends to push the gates shut, it is desirable to throttle the discharge from servomotor 17 upon gate closing movement thereof as shown in the drawing rather than shutting off the intake conduit 21 because the gates might continue to close as a result of the force applied to them by the water in casing 5 even though the intake conduit 21 were shut off. Providing throttling means in the conduit that discharges pressure fluid from the servomotor when gates 8 are closing insures that the servomotor 17 will be stalled if necessary. Throttling valve 83 is operated by admitting pressure fluid to the valve which acts upon a piston 84 to shut off the flow in conduit 20.

The throttling means include throttle valve control means which are provided for controlling the operation of throttle valve 83. The throttling valve control means comprises the following described structure. A conduit 85 connected to conduit 57, a conduit 86 connected to the throttle valve 83, and a control valve 87 for controlling the flow of pressure fluid from conduit 57 through conduit 85 to conduit 86. A piston 88 within valve 87 is movable so as to either shut off conduit 85 and drain conduit 86, or to establish communication from conduit 85 to conduit 86. Valve 87 is so constructed that moving a stem 89 causes the aforementioned movement of piston 88. Stem 89 is connected to a floating lever 90 between the two ends thereof, by a pin 91. One end of floating lever 90 is engageable with piston 40 (of the bypass control means) by means of a collar 92 secured to the piston. Upward movement of piston 40 will raise collar 92 until it engages lever 90 and further upward movement of piston 40 will rotate lever 90 clockwise about pin 91. A second collar 93 is attached to rod 80 and is engageable with the other end of lever 90. When collar 92 rotates lever 90 clockwise about pin 91 the other end of lever 90 will engage collar 93. Further upward movement of piston 40 will then rotate lever 90 clockwise about collar 93 and stem 89 will be raised to port pressure fluid into conduit 86 for closing throttle valve 83. The clearance shown in the drawing between the ends of lever 90 and the collars 92, 93 is provided to permit a predetermined amount of bypass opening movement (upward) of piston 40 (of the bypass control means) before lever 90 is rotated to lift stem 89 and cause closing of throttle valve 83. This lost motion gives the control system an opportunity to open pressure regulator 7 before stalling the gate operating servomotor 17. If pressure regulator 7 opens properly in response to upward movement of piston 40 collar 93 will be lowered away from engagement with lever 90, stem 89 will not be lifted and the valve 83 will remain open. Thus bypass opening action of the bypass control means (upward movement of piston 40 which is part of the bypass control means) greater than a predetermined amount tends to operate the throttling means (valves 87 and 83) so as to stop gate closing action of servomotor 17, but if the bypass means (pressure regulator 7) opens properly the aforesaid tendency is neutralized by the lowering of collar 93.

From the foregoing it will be apparent to those skilled in the art that the illustrated embodiment of the invention provides a new and improved control system for hydraulic turbines and accordingly accomplishes the objects of the invention. On the other hand, it will also be obvious to those skilled in the art that the illustrated embodiment of the invention may be variously changed and modified, or features thereof singly or collectively embodied in combinations other than as illustrated without departing from the spirit of the invention or sacrificing all of the advantages thereof and accordingly the disclosure herein is illustrative only and the invention is not limited thereto.

It is claimed and desired to secure by Letters Patent:

1. In a control system for a hydraulic turbine, the combination comprising: delivery means for delivering water to said turbine; inlet valve means interposed between said delivery means and said turbine for controlling flow of water to said turbine; bypass means including flow varying means connected to said delivery means for bypassing water around said turbine; operating means connected to said inlet valve means for operating said inlet valve means; bypass control means connected to said bypass means for opening and closing said bypass means; throttling means connected to said bypass control means and said operating means for throttling closing action of said operating means in response to bypass opening action of said bypass control means in excess of a predetermined amount; and means connecting said bypass means to said throttling means for neutralizing said throttling means in response to opening action of said bypass means.

2. In a control system for a hydraulic turbine, the combination comprising: delivery means for delivering water to said turbine; inlet valve means interposed between said delivery means and said turbine for controlling flow of water to said turbine; bypass means including flow varying means connected to said delivery means for bypassing water around said turbine; operating means connected to said inlet valve means for operating said inlet valve means; throttling means connected to said valve operating means operative to throttle closing action of said valve operating means; bypass control means connected to said bypass means for opening and closing said bypass means; throttling control means so connected to said throttling means and said bypass control means that bypass opening action of said bypass control means greater than a predetermined amount tends to operate said throttling means so as to throttle closing action of said valve operating means; and means so connecting said throttling control means to said bypass means that opening of said bypass means neutralizes the aforesaid tendency.

3. In a control system for a hydraulic turbine, the combination comprising: delivery means for delivering water to said turbine; inlet valve means interposed between said delivery means and said turbine for controlling flow of water to said turbine; bypass means including flow varying means connected to said delivery means for bypassing water around said turbine; turbine inlet valve operating means connected to said inlet valve means; throttling means connected to said valve operating means and operative to throttle closing action of said valve operating means; bypass control means connected to said valve operating means for opening said bypass means in response to closing action of said valve operating means and for closing said bypass means in response to opening action of said valve operating means; throttling control means so connected to said throttling means and said bypass control means that bypass opening action of said bypass control means greater than a predetermined amount tends to operate said throttling means so as to throttle closing action of said valve operating means; and means so connecting said throttling control means to said bypass means that opening of said bypass means neutralizes the aforesaid tendency.

4. In a control system for a hydraulic turbine, the combination comprising: delivery means for delivering water to said turbine; inlet valve means interposed between said delivery means and said turbine for controlling flow of water to said turbine; bypass means including flow varying means connected to said delivery means for bypassing water around said turbine; turbine inlet valve operating means connected to said inlet valve means; throttling means connected to said valve operating means operative to throttle closing action of said valve operating means; bypass control means connected to said valve operating means for opening said bypass means in response to closing action of said valve operating means and for closing said bypass means in response to opening action of said valve operating means; adjusting means connected to said bypass control means and responsive to predetermined opening and closing action of said bypass means to adjust said bypass control means to stop action of said bypass means; and throttling control means so connected to said throttling means and so engageable with said bypass control means that bypass opening action of said bypass control means greater than a predetermined amount tends to operate said throttling means so as to throttle closing action of said valve operating means; and said throttling control means being so engageable with said adjusting means that opening of said bypass means neutralizes the aforesaid tendency.

5. In a control system for a hydraulic turbine, the combination comprising: delivery means for delivering water to said turbine; inlet valve means interposed between said delivery means and said turbine for controlling flow of water to said turbine; bypass means including flow varying means connected to said delivery means for bypassing water around said turbine; a first fluid operated servomotor connected to said inlet valve means for operating said inlet valve means; a throttling valve connected to said first servomotor for controlling pressure of the operating fluid for said first servomotor; a second fluid operated servomotor connected to said bypass means for operating said bypass means; second servomotor control means connected to said second servomotor and including a pilot valve and an operating leverage connected to said first servomotor for controlling pressure of the operating fluid for said second servomotor and responsive to turbine inlet valve closing action of said first servomotor to cause said bypass means to open and said second servomotor control means also responsive to turbine inlet valve opening action of said first servomotor to cause said bypass means to close; an adjusting leverage connected to said pilot valve operating leverage and said second servomotor responsive to predetermined bypass opening and closing operation of said second servomotor to adjust said pilot valve operating leverage to stop operation of said second servomotor; and throttling valve operating means connected to said throttling valve and engagable with said pilot valve operating leverage through lost motion connection means so that bypass opening action of said operating leverage greater than a predetermined amount tends to operate said throttling valve so as to throttle inlet valve closing action of said first servomotor, and said throttling valve control means being so engageable with said adjusting leverage that bypass opening action of said second servomotor neutralizes the aforesaid tendency.

6. In a control system for a hydraulic turbine, the combination comprising: delivery means for delivering water to said turbine; inlet valve means interposed between said delivery means and said turbine adjustable to control flow of water to said turbine; bypass means including flow varying means connected to said delivery means for bypassing water around said turbine; a first fluid operated servomotor connected to said inlet valve means for adjusting said inlet valve means; a fluid operated throttling valve connected to said first servomotor for controlling pressure of operating fluid for said first servomotor and operative to throttle turbine inlet valve closing action of said first servomotor; a second fluid operated servomotor connected to said bypass means for operating said bypass means; second servomotor control means connected to said second servomotor and including a first pilot valve for controlling pressure of operating fluid for said second servomotor and an operating leverage connected to said first pilot valve for operating said first pilot valve; an adjusting leverage connected to said operating leverage and said second servomotor for restoring said first pilot valve to a neutral position when said second servomotor operates in a predetermined manner in response to an adjustment of said operating leverage; and a second pilot valve connected to said throttling valve for controlling the pressure of fluid for operating said throttling valve, said second pilot valve having a stem which when lifted causes fluid pressure to be admitted to said throttling valve and said throttling valve to throttle turbine inlet valve closing action of said first servomotor, said second pilot valve being operable by a floating lever pivotally connected to said stem, a first collar member attached to said operating leverage engageable with said floating lever upon bypass opening movement of said operating leverage in excess of a predetermined amount to thereby rotate said floating lever about said stem, and a second collar member attached to said adjusting leverage engageable with said floating lever, whereby bypass opening movement of said operating leverage in excess of said predetermined amount will rotate said floating lever about said stem until said floating lever engages said second collar member and then will rotate said floating lever about said second collar to lift said stem unless bypass opening movement of said second servomotor moves said adjusting lever to disengage said second collar member from said floating lever.

7. In a control system for a hydraulic turbine, the combination comprising delivery means for delivering water to said turbine; inlet valve means interposed between said delivery means and said turbine for controlling flow of water to said turbine; bypass means including flow varying means connected to said delivery means for bypassing water around said turbine; turbine inlet valve operating means connected to said inlet valve means; throttling means connected to said valve operating means operative to throttle closing action of said valve operating means; bypass control means connecting said valve operating means to said bypass means; said bypass control means including a predetermined rate and predetermined time delay responsive device; said bypass control means being operative to open said bypass means in response to closing action of said valve operating means at a rate faster than said predetermined rate and then after said time delay to close said bypass means; throttling control means so connected to said throttling means and to said bypass control means by a predetermined bypass opening action responsive device so that bypass opening action of said bypass control means greater than said predetermined amount tends to operate said throttling means so as to throttle closing action of said valve operating means; and means so connecting said throttling control means to said bypass means that opening of said bypass neutralizes the aforesaid tendency.

8. In a control system for a hyradulic turbine, the combination comprising: delivery means for delivering water to said turbine; inlet valve means interposed between said delivery means and said turbine for controlling flow of water to said turbine; bypass means including flow varying means connected to said delivery means for bypassing water around said turbine; turbine inlet valve operating means connected to said inlet valve means; throttling means connected to said valve operating means operative to throttle closing action of said valve operating means; bypass control means connecting said valve operating means to said bypass means; said bypass control means including a predetermined rate and predetermined time delay responsive device; said bypass control means being operative to open said bypass means in response to closing action of said valve operating means at a rate faster than said predetermined rate; adjusting means connected to said bypass control means and responsive to opening and closing action of said bypass means to restore said bypass control means to an adjustment that will stop further action of said bypass means; throttling control means so connected to said throttling means and engageable through a predetermined delayed action connection with said bypass control means so that bypass opening action of said bypass control means greater than said predetermined amount tends to operate said throttling means so as to throttle closing action of said valve operating means, and said throttling control means being so engageable with said adjusting means that opening of said bypass neutralizes the aforesaid tendency; and said device being responsive to said predetermined time delay after bypass opening action of said bypass control means to adjust said bypass control means to close said bypass means.

9. In a control system for a hydraulic turbine, the combination comprising: delivery means for delivering water to said turbine; inlet valve means interposed between said delivery means and said turbine for controlling flow of water to said turbine; bypass means including flow varying means conected to said delivery means for bypassing water around said turbine; a first fluid operated servomotor connected to said inlet valve means for operating said inlet valve means; a throttling valve connected to said first servomotor for controlling pressure of the operating fluid for said first servomotor; a second fluid operated servomotor connected to said bypass means for operating said bypass means; second servomotor control means connected to said second servomotor including a pilot valve and an operating leverage connected to said first servomotor for controlling pressure of the operating fluid for said second servomotor, said operating leverage including a predetermined rate and predetermined time delay responsive device; said second servomotor control means being operative to open said bypass means in response to closing action of said first servomotor at a rate faster than said predetermined rate to cause said bypass means to open; an adjusting leverage connected to said pilot valve operating leverage and said second servomotor responsive to bypass opening and closing operation of said second servomotor to restore said pilot valve operating leverage to an adjustment that will stop further operation of said second servomotor; throttling valve control means connected to said throttling valve and engageable through a predetermined delayed action connection with said pilot valve operating leverage so that bypass opening action of said operating leverage greater than said predetermined amount tends to operate said throttling valve so as to throttle turbine inlet valve closing action of said first servomotor, and said throttling valve control means being so engageable with said adjusting leverage that bypass opening action of said second servomotor neutralizes the aforesaid tendency, and said device being responsive to said predetermined time delay after bypass opening action of said operating leverage to adjust said operating leverage to close said bypass means.

10. In a control system for a hydraulic turbine, the combination comprising: delivery means for delivering water to said turbine; inlet valve means interposed between said delivery means and said turbine adjustable to control flow of water to said turbine; bypass means including flow varying means connected to said delivery means for bypassing water around said turbine; a first fluid operated servomotor connected to said inlet valve means for adjusting said inlet valve means; a fluid operated throttling valve connected to said first servomotor for controlling pressure of operating fluid for said first servomotor and operative to throttle turbine inlet valve closing action of said first servomotor; a second fluid operated servomotor connected to said bypass means for operating said bypass means; bypass control means connected to said second servomotor including a first pilot valve for controlling pressure of operating fluid for said second servomotor, an operating leverage connected to said first pilot valve for operating said first pilot valve, and predetermined rate and predetermined time delay responsive dashpot means connecting said operating leverage to said first servomotor so that turbine inlet valve closing action of said first servomotor faster than said predetermined rate will cause said bypass means to open; an adjusting leverage connected to said operating leverage and said second servomotor for restoring said first pilot valve to a neutral position when said second servomotor operates in response to an adjustment of said operating leverage; and a second pilot valve connected to said throttling valve for controlling the pressure of fluid for operating said throttling valve, said second pilot valve having a stem which when lifted causes fluid pressure to be admitted to said throttling valve and said throttling valve to throttle turbine inlet valve closing action of said first servomotor, said second pilot valve being operable by a floating lever pivotally connected to said stem, a first collar member attached to said operating leverage spaced a predetermined distance from said floating lever and engageable therewith upon bypass opening movement of said operating leverage in excess of said predetermined distance to thereby rotate said floating lever about said stem and into engagement with a second collar member attached to said adjusting leverage, whereby bypass opening movement of said operating leverage in excess of said predetermined distance wil rotate said floating lever about said stem until said floating lever engages said second collar member and then will rotate said floating lever about said second collar to lift said stem unless bypass opening movement of said second servomotor moves said adjusting lever and thereby disengages said second collar member from said floating lever.

11. In a control system for a hydraulic turbine, the combination comprising: delivery means for delivering water to said turbine; inlet valve means interposed between said delivery means and said turbine for controlling flow of water to said turbine; bypass means including flow varying means connected to said delivery means for bypassing water around said turbine; turbine inlet valve operating means connected to said inlet valve means; throttling means connected to said valve operating means operative to throttle closing action of said valve operating means; bypass control means connecting said valve operating means to said bypass means; said bypass control means including a predetermined rate and predetermined time delay responsive device; said bypass control means being operative to open said bypass means in response to closing action of said valve operating means at a rate faster than said predetermined rate and will not open said bypass means if the rate is slower than said predetermined rate until said valve operating means has moved said inlet valve means from a predetermined open position a predetermined amount toward closed position; means connected to said device for adjusting said predetermined amount of movement to make it either zero or a greater amount within the limits of adjustment; throttling control means so connected to said throttling means and said bypass control means that bypass opening action of said bypass control means greater than a predetermined amount tends to operate said throttling means so as to throttle closing action of said valve operating means; and means so connecting said throttling control means to said bypass means that opening of said bypass neutralizes the aforesaid tendency.

12. In a control system for a hydraulic turbine, the combination comprising: delivery means for delivering water to said turbine; inlet valve means interposed between said delivery means and said turbine for controlling flow of water to said turbine; bypass means including flow varying means connected to said delivery means for bypassing water around said turbine; turbine inlet valve operating means connected to said inlet valve means; throttling means connected to said valve operating means and operative to throttle closing action of said valve operating means; bypass control means connecting said valve operating means to said bypass means; said bypass control means including a predetermined rate and predetermined time delay responsive device; said bypass control means being operable to open said bypass means in response to closing action of said valve operating means at a rate faster than said predetermined rate and will not open said bypass means if the rate is slower than said predetermined rate until said valve operating means has moved said inlet valve means from a predetermined open position a predetermined amount toward closed position; first adjusting means connected to said device for adjusting said predetermined amount of movement to make it either zero or a greater amount within the limits of adjustment; second adjusting means connected to said bypass control means and responsive to predetermined opening and closing action of said bypass means to adjust said bypass control means to stop action of said bypass means; and throttling control means so connected to said throttling means and so engageable with said bypass control means that bypass opening action of said bypass control means greater than a predetermined amount tends to operate said throttling means so as to throttle closing action of said valve operating means; and said throttling control means being so engageable with said second adjusting means that opening of said bypass neutralizes the aforesaid tendency.

13. In a control system for a hydraulic turbine, the combination comprising: delivery means for delivering water to said turbine; inlet valve means interposed between said delivery means and said turbine for controlling flow of water to said turbine; bypass means including flow varying means connected to said delivery means for bypassing water around said turbine; a first fluid operated servomotor connected to said inlet valve means for operating said inlet valve means; a throttling valve connected to said first servomotor operative to control pressure of operating fluid in said first servomotor so as to throttle closing action of said inlet valve means; a second fluid operated servomotor connected to said bypass means for operating said bypass means; second servomotor control means connected to said second servomotor including a pilot valve for controlling pressure of the operating fluid for said second servomotor and a pilot valve operating leverage connecting said first servomotor to said pilot valve; said pilot valve operating leverage including a predetermined rate and predetermined time delay responsive device; said pilot valve operating leverage being operative to adjust said pilot valve to operate said second servomotor to open said bypass means in response to turbine inlet valve closing action of said first servomotor at a rate faster than said predetermined rate and will not open said bypass means if the rate is slower than said predetermined rate until said valve means has moved from a predetermined open position a predetermined amount toward closed position; manually operable adjusting means connected to said device for adjusting said predetermined amount of movmeent to make it either zero or a greater amount within the limits of adjustment; an adjusting leverage connected to said pilot valve operating leverage and said second servomotor responsive to predetermined bypass opening and closing operation of said second servomotor to adjust said pilot valve operating leverage to stop operation of said second servomotor; and throttling valve control means so connected to said throttling valve and so engageable with said pilot valve operating leverage that bypass opening action of said operating leverage greater than a predetermined amount tends to operate said throttling valve so as to throttle valve closing action of said first servomotor, and said throttling valve control means being so engageable with said adjusting leverage that bypass opening action of said second servomotor neutralizes the aforesaid tendency.

14. In a control system for a hydraulic turbine, the combination comprising: delivery means for delivering water to said turbine; inlet valve means interposed between said delivery means and said turbine for controlling flow of water to said turbine; bypass means including flow varying means connected to said delivery means for bypassing water around said turbine; a first fluid operated servomotor connected to said inlet valve means for operating said inlet valve means; a throttling valve connected to said first servomotor operative to control pressure of operating fluid in said first servomotor and operative to throttle closing action of said inlet valve means; a second fluid operated servomotor connected to said bypass means for operating said bypass means; bypass control means connected to said second servomotor including a pilot valve for controlling pressure of the operating fluid for said second servomotor and a pilot valve operating leverage connecting said first servomotor to said pilot valve; said pilot valve operating leverage including a predetermined rate and predetermined time delay responsive device; said pilot valve operating leverage being operative to adjust said pilot valve to operate said second servomotor to open said bypass means in response to turbine inlet valve closing action of said first servomotor at a rate faster than said predetermined rate and will not open said bypass means if the rate is slower than said predetermined rate until said valve means has moved from a predetermined open position a predetermined amount toward closed position; manually operable adjusting means connected to said device for adjusting said predetermined amount of movement to make it either zero or a greater amount within the limits of adjustment; an adjusting leverage connected to said first pilot valve operating leverage and said second servomotor for restoring said first pilot valve to a neutral position when said second servomotor operates in response to an adjustment of said operating leverage; and a second pilot valve for controlling the pressure of fluid for operating said operating said throttling valve, said second pilot valve having a stem which when lifted causes fluid pressure to be admitted to said throttling valve and said throttling valve to throttle turbine inlet valve closing action of said first servomotor, said second pilot valve being operable by a floating lever pivotally connected to said stem, a first collar member attached to said operating leverage engageable with said floating lever upon bypass closing movement of said operating leverage in excess of a predetermined amount to rotate said floating lever about said stem and into engagement with a second collar member attached to said adjusting leverage, whereby bypass opening movement of said operating leverage in excess of said predetermined amount will rotate said floating lever about said stem until said floating lever engages said second collar member and then will rotate said floating lever about said second collar to lift said stem unless bypass opening movement of said second servomotor moves said adjusting leverage lever and disengages said second collar member from said floating lever.

References Cited in the file of this patent

UNITED STATES PATENTS

| 1,873,955 | Creager | Aug. 30, 1932 |
| 2,646,812 | Rheingans et al. | July 28, 1953 |
| 2,681,660 | Avery et al. | June 22, 1954 |